INVENTORS
David C. Bailey
Leroy C. Kleist
Kenneth H. Love

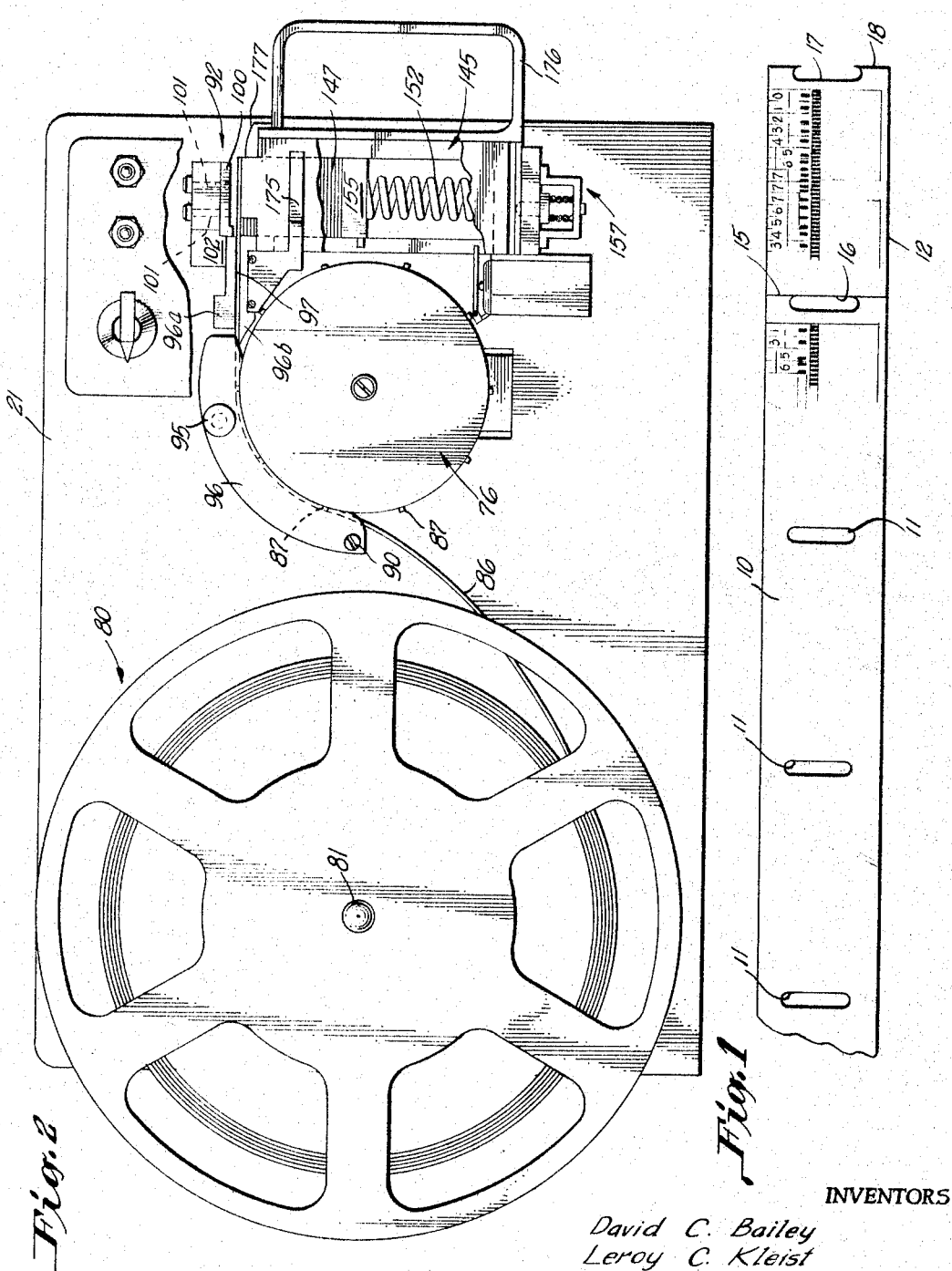

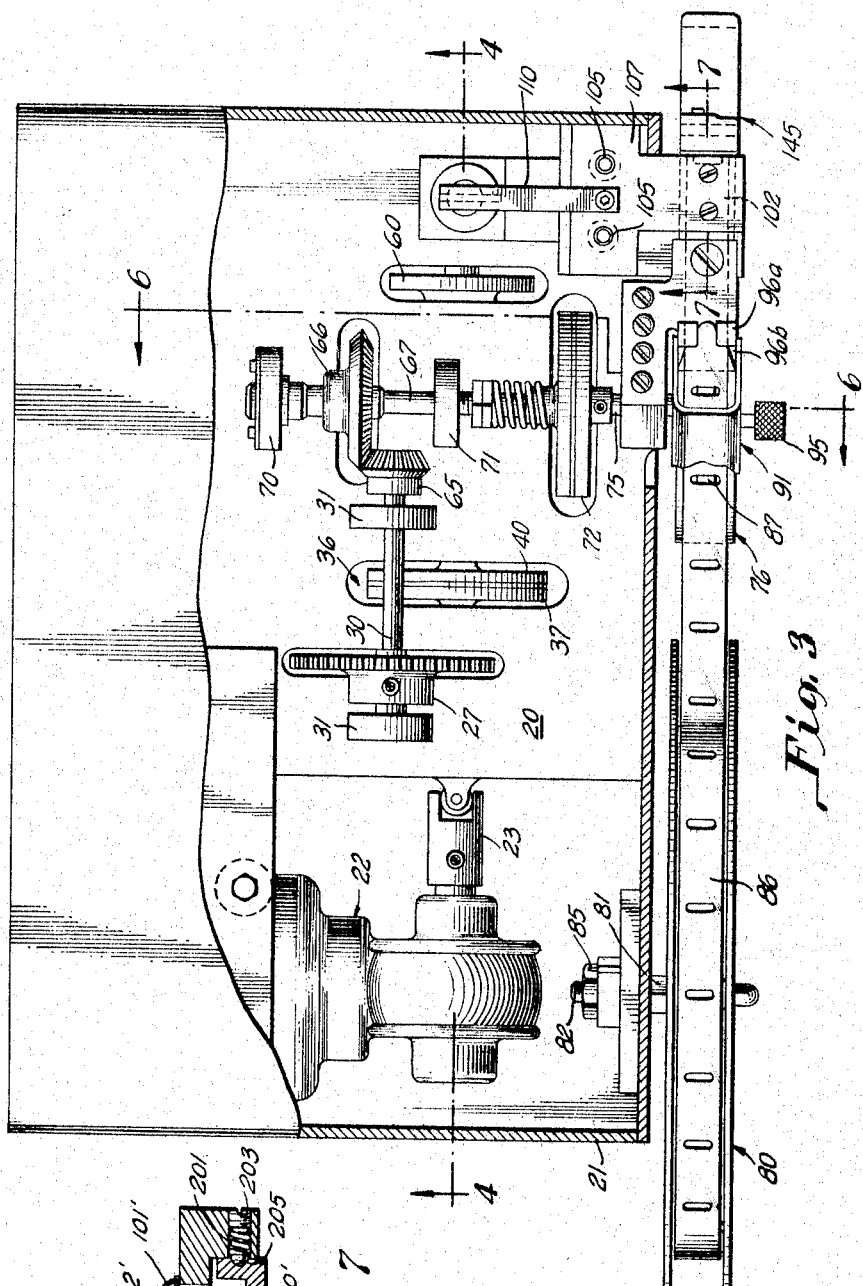
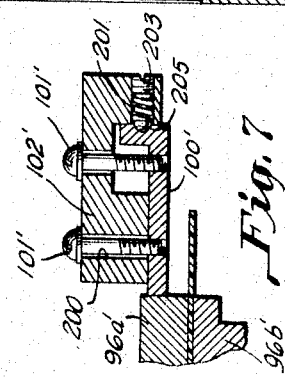

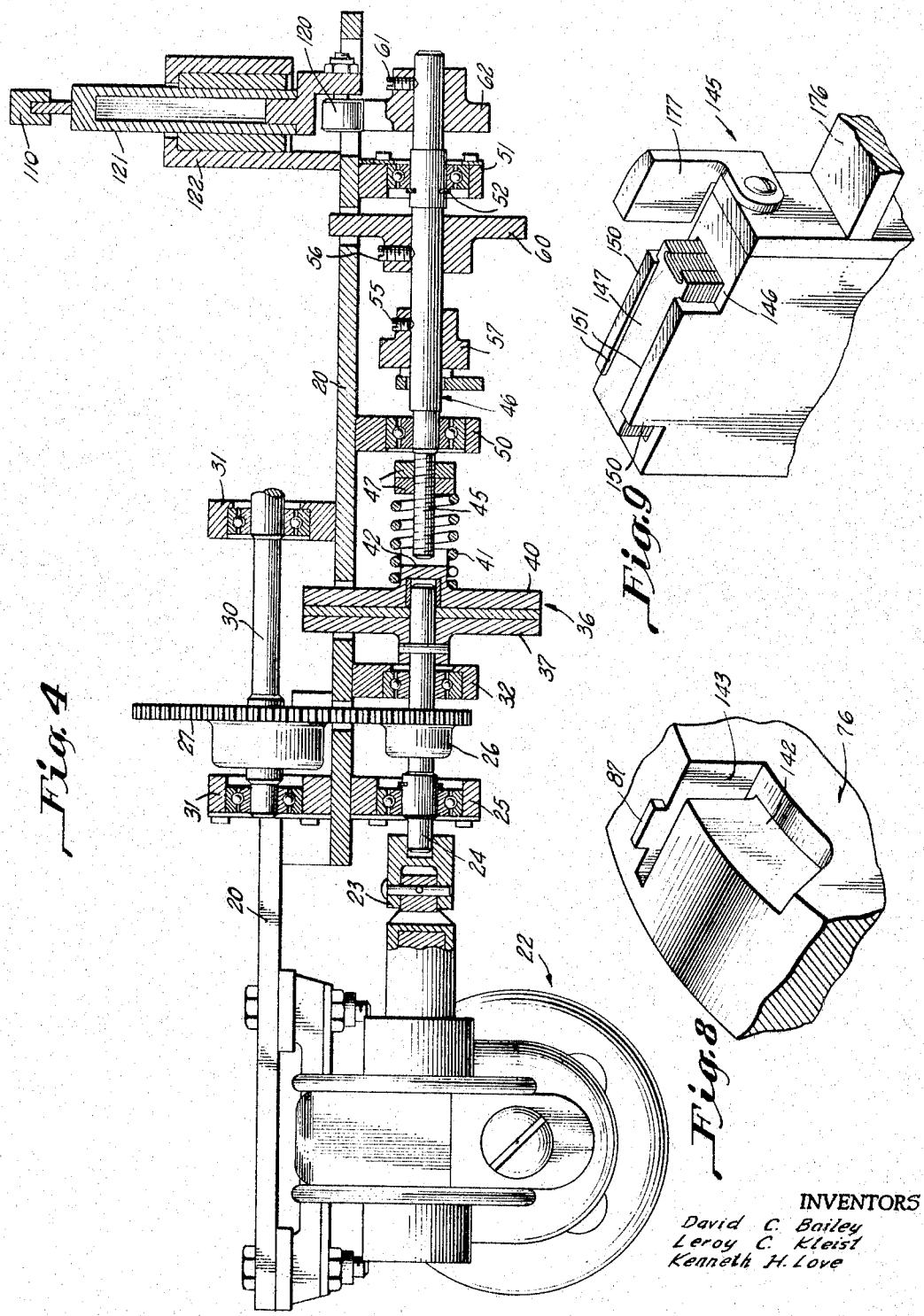

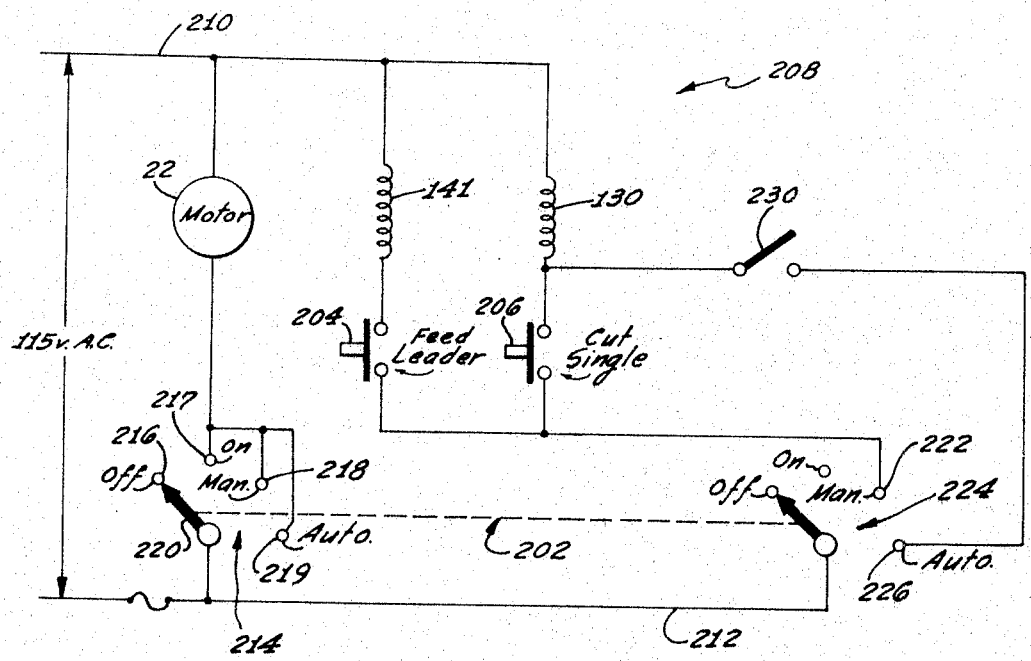

United States Patent Office 3,320,842
Patented May 23, 1967

3,320,842
FILM CUTTER
David C. Bailey, Champaign, Leroy C. Kleist, Ogden, and Kenneth H. Love, Urbana, Ill., assignors to The Magnavox Company, Fort Wayne, Ind., a corporation of Delaware
Filed Nov. 5, 1963, Ser. No. 322,277
29 Claims. (Cl. 83—61)

The present invention relates to a film cutter and to a device for cutting film into small segments hereinafter called cards, said cards acting as a storage medium for information in a reduced form.

This a continuation in part of copending application for a Film Cutter, Ser. No. 141,875 filed Sept. 29, 1961 and now abandoned, in the name of Leroy C. Kleist and assigned of record to The Magnovox Company.

One method of filing documentary information involves the use of photography to record graphic and printed information in greatly reduced form on tiny pieces of film. These pieces of film are marked with visible numbers and with coding suitable for machine reading techniques and are then filed manually (at least in the first instance) in a much smaller space than would be occupied by conventional papers carrying the documentary information. Obviously, the use of manual filing reduces the expense which would be incident to a filing and retrieval system operated substantially automatically by coding on the film.

It is desirable that means be provided for assisting the operator in manually filing such cards. Such a means comprises an indentation formed in one end of the film card as illustrated in the copending application of John C. Koonz et al., Ser. No. 41,947, and assigned to the same assignee as the present application. Such an indentation is useful in properly placing the film in film capsules of the type described in the copending application of Leroy C. Kleist and Donald E. Craig entitled, Card Capsule, filed Sept. 15, 1961, Ser. No. 138,734, now U.S. Patent No. 3,212,667 issued October 19, 1965. Consequently, one object of the present invention is to provide a device for providing cards or films of reduced size with an indentation at one end thereof for aiding in orienting cards during filing.

Another object of the present invention is to provide an improved film cutter that may automatically cut a continuous strip of film into a plurality of film cards and simultaneously therewith stack the cards in a suitable capsule.

Still another object of the present invention is to provide an improved device for cutting perforated film in such a manner that a plurality of cards are formed each having a single indentation of the same size and shape at one end of the card.

A still further object of the present invention is to provide an improved film cutter that may be operated in several different modes so as to completely automatically cut a film strip into separate cards and to stack the cards or may be operated manually so as to individually cut a single card at a time or so as to feed the film therethrough without cutting any of the film.

Related objects and advantages will become apparent as the description proceeds.

One embodiment of the present invention comprises a device for forming a card with an indentation in one end thereof and includes a cutter having a pair of cutter blades. There is also provided means for positioning perforated film between the cutter blades with the blades aligned with one side of each perforation and also means for operating the cutter blades when the film is so positioned.

The full nature of the invention will be understood from the accompanying drawings and the following description and claims:

FIGURE 1 is an enlarged plan view of a strip of film showing a cut as made by the device of the present invention to produce the above mentioned card.

FIGURE 2 is a front elevation of a film cutter embodying the present invention.

FIGURE 3 is a top plan view of the structure of FIGURE 2 with portions thereof broken away.

FIGURE 4 is a vertical section taken along the line 4—4 of FIGURE 3 in the direction of the arrows.

FIGURE 7 is a vertical section of a cutter forming an alternative embodiment of the invention, said vertical section being taken as if along the line 7—7 of FIGURE 3.

FIGURE 8 is a fragmentary perspective view of a portion of a wheel forming a part of the structure illustrated in FIGURES 2–6.

FIGURE 9 is a fragmentary perspective view of a portion of a film receptacle also illustrated in FIGURES 2, 5 and 6.

FIGURE 10 is a wiring diagram of a control means for operating the film of FIGURE 2.

Figure 5:
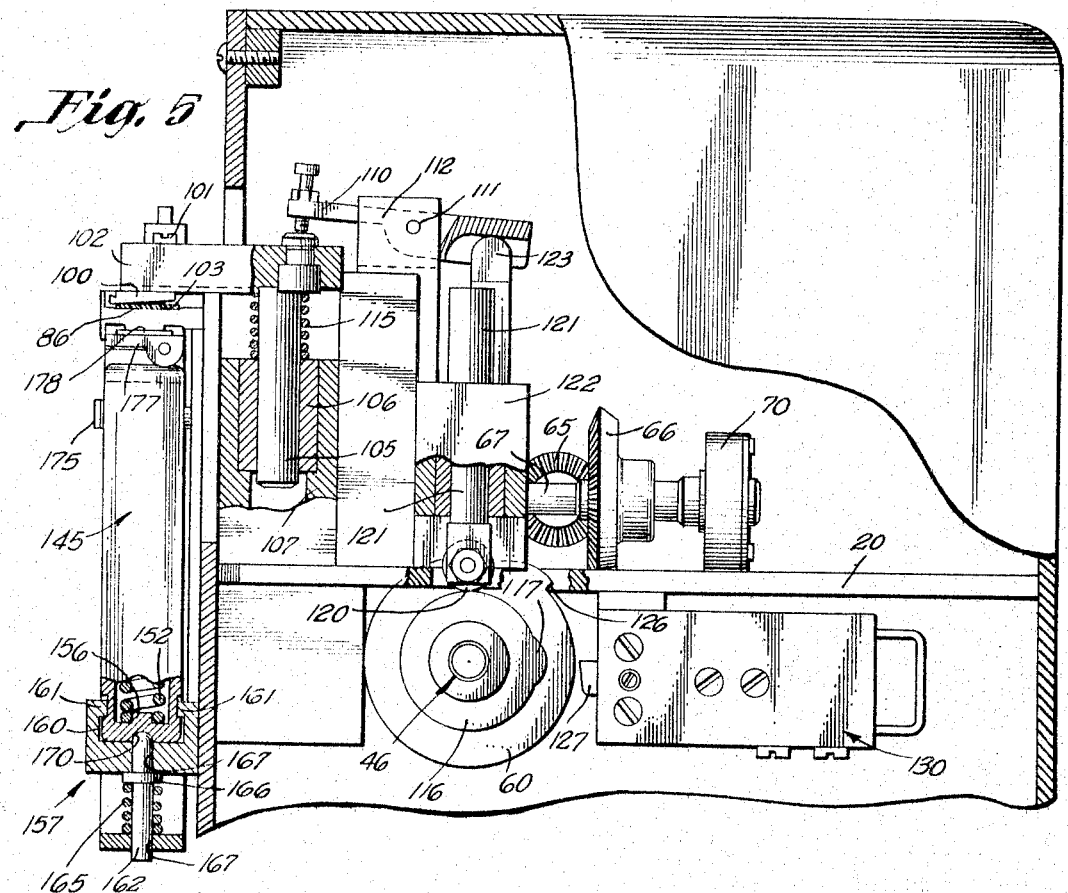
FIGURE 5 is an end elevation of the structure of FIGURE 2 with portions thereof broken away.

Referring to the drawings in more detail and particularly to FIGURE 1 thereof, the present invention is particularly adapted to be embodied in a machine 1 for processing a strip of film 10 having documentary material photographically recorded thereon. The machine 1 is adapted to receive a spool or reel 80 containing a continuous strip of film 10 and to cut the strip into a plurality of substantially identical cards 12 and stack the cards 12. Although the film 10 may be of any desired configuration, in the present instance the strip of film 10 has a series of equally spaced elongated perforations 11 which extend transversely of the film strip and are each identical in size and shape. These perforations are substantially equally spaced from each other and are effective to define a series of separate frames 13 of substantially identical size and shape. Prior to the cutting operation accomplished by the present invention, each of the frames 13 in the film 10 may be exposed and developed to provide a visual image having a zone 2 with machine readable coding, visible numerals and with the documentary information reduced in size (as suggested in FIGURE 1). If it is so desired the documentary information portion may include several document areas with each area including a reduced copy of the document to be stored.

In order to process the film 10 by the machine 1 to produce the cards 12 for storage, the strip of film is cut as at 15 in a straight line and at the one edge 16 of each perforation so that the complete perforation forms an indentation 17 in only one end 18 of the card. This operation is performed by the machine 1 illustrated in FIGURES 2—9.

Referring to those figures, the machine or film cutter 1 comprises a base 20 enclosed by a housing 21. Received within the housing and mounted upon the base is a preferably electric drive motor 22 which is coupled by means of a universal joint 23 to a shaft 24 received with a bearing mount 25 fixed to the base 20. A spur gear 26 is mounted upon the shaft 24 and meshes with a larger spur gear 27 fixed to a shaft 30 rotatably mounted within suitable bearing mounts 31 fixed to the base 20.

The shaft 24 further extends through a bearing mount 32 fixed to the base 20 and has fixedly mounted upon the end thereof half of a slip clutch 36. The slip clutch 36 includes the clutch drive facing 37 fixed to the shaft 24 and a further clutch drive facing 40 reciprocably received upon the end of the shaft 24. The clutch facing 40 is yieldably held in engagement with the clutch facing 37 by means of a spring 41 seated about the central protuberance 42 on the clutch facing 40 and also about the threaded end 45 of a further shaft 46. The spring 41 bears against the clutch facing 40 and also against a pair of jam nuts 47 received on the threaded portion 45. It can be appreciated that rotation of the shaft 24 will be transmitted through the slip clutch 36 except when the shaft 46 is locked against rotation, in which case the spring 41 will yield sufficiently and the clutch facing 37 will rotate with respect to the clutch facing 40.

The shaft 46 is rotatably mounted within bearing mounts 50 and 51 fixed to the base 20. The shaft 46 is prevented against rightward movement as viewed in FIGURE 4, by means of a snap ring 52 received in a suitable peripheral indentation in the shaft. Fixed to the shaft 46 by means of suitable setscrews 55 and 56 are a release cam 57 and a stop cam 60. Also fixed to the shaft 46 by a suitable setscrew 61 is a cutter cam 62.

Referring to FIGURE 3, it can be seen that the shaft 30 has mounted upon its rightward end a bevel gear 65 which drives a bevel gear 66 fixedly mounted upon the shaft 67 rotatably received within bearing mounts 70 and 71. A slip clutch 72, identical to the above described slip clutch 36, is driven by the shaft 67 and is mounted thereon and upon a shaft 75 which is rotatably mounted within a suitable bearing fixed to the base 20 and which has mounted upon its outboard end a wheel indicated generally by the numeral 76. It can be appreciated if the wheel 76 or the shaft 75 is locked in position, the shaft 67 will continue to rotate through the action of the slip clutch 72. However, if the wheel 76 is not locked in position, rotary drive will be transmitted from the shaft 67 through the slip clutch to the wheel 76.

Referring to FIGURE 2, upon the forward surface of the housing 21, there is mounted a film reel 80. This reel is freely rotatable upon a projection 81 having a threaded portion 82 and fixed to the housing by a nut 85.

The film 86 which is perforated as illustrated in FIGURE 1, is drawn from the reel 80 by means of the wheel 76. The wheel is provided with a plurality of teeth 87 which are equally spaced about the outer periphery of the wheel and project from the wheel a distance approximately equal to the thickness of the film 86. Each of the teeth 87 are equally spaced by a distance equal to the distance between the perforations in the film. Thus, as the wheel 76 is rotated, the teeth are inserted, in order, into the perforations in the film. Pivoted at 90 to the forward portion of the housing 21 is a retaining lever 91 which, through the action of gravity, rides over the top of the wheel 76. The lever 91 functions to maintain the teeth 87 on the wheel in engagement with the perforations 11 in the film until the film leaves the wheel and moves into a film guide 96. If desired, the lever 91 may be swung away from the wheel by means of handle 95 to permit positioning of the film on the wheel, etc.

The film guide is fixed to the forward portion of the housing and is formed in two parts 96a and 96b. These two parts are spaced to define a horizontal channel or passage 97 through which the film can pass upon movement away from the wheel 76. The rightward end of the guide 96b is a relatively sharp edge that is disposed normal to the length of the strip of film. This edge may function as a stationary cutter blade and cooperates with the leftward end of a movable cutter blade 100 which is mounted by means of screws 101 to a blade carrier or cutting head 102.

It will be noted from FIGURE 5 that the movable blade 100 has a tapering cutting edge 103 that cooperates with the edge of the guide 96b to shear the film transversely thereof. The taper of the edge 103 assists in cutting the film 86 by beginning the shearing operation at the outward edge thereof. The blade carrier 102 is fixed to the upper end of a vertically reciprocal pair of rods 105 which are received within bearings 106 fixed to the base 20 by a bearing mount 107. A lever 110 is pivoted at 111 to a lever mount 112 fixed to the base 20. The blade carrier 102 is normally held in an upward position under the action of a compression spring 115 received about each vertically reciprocal rod 105 and between the blade carrier 102 and the bearing 106. The blade carrier 102 may be moved vertically downwardly to perform the cutting operation by actuation of the lever 110 from a cam 116 having a hump 117 and fixedly mounted upon the shaft 46. The actuation is transmitted to the lever 110 through a roller 120 rotatably mounted upon a vertical element 121 reciprocable within a bearing mount 122 and bearing at its upper end 123 against the lever 110.

Also visible in FIGURE 5 is the stop cam 60 which has a surface 126 extending radially from the axis of the shaft 46 and adapted to abut the projected stopping element 127 to block rotation of the cam 57 and the shaft 46. The stopping element 127 may be retracted to disengage the surface 126 by means of a solenoid 130 mounted upon the base 20. Resilient means (not shown) are provided for normally maintaining the element 127 in projected position.

Figure 6:
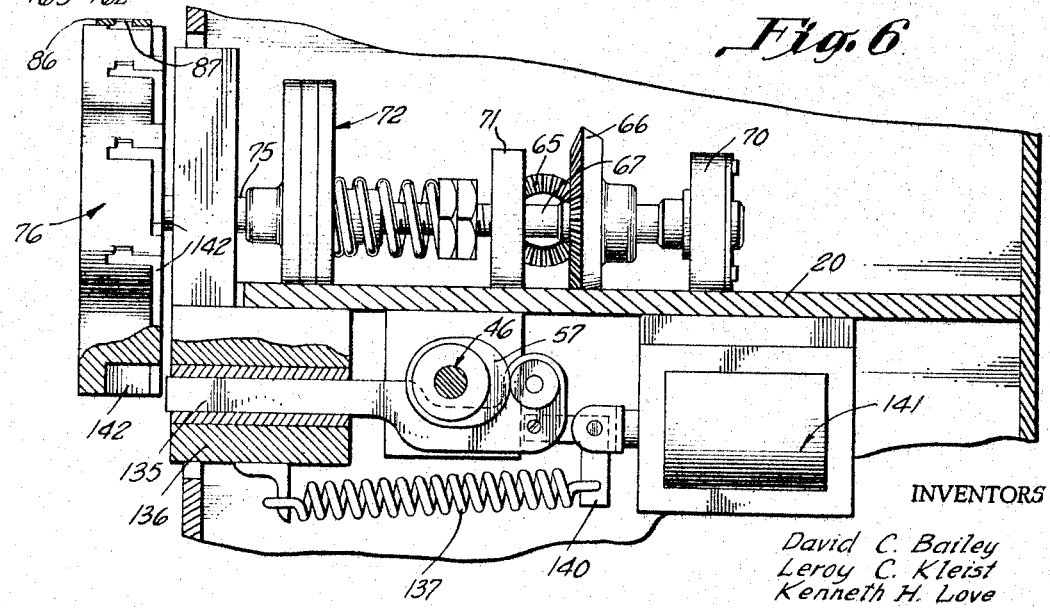
FIGURE 6 is a vertical section taken along the line 6—6 of FIGURE 3.

FIGURE 6 shows the details of a device for stopping rotation of the wheel 76 when the film 86 is positioned properly for a cut such as the cut 15 in FIGURE 1. This device includes a stop bar 135 which is horizontally reciprocal within a bearing mount 136 fixed to the base 20. The stop bar 135 is normally urged to a projected position by means of a tension spring 137 fixed to the bearing mount 136 and to an L-shaped member 140 fixed to the stop bar. The stop bar may be moved to a retracted position by either a solenoid 141 fixed to the base 20 or by the release cam 57.

Referring to FIGURE 8, the wheel 76 is provided with a plurality of recesses 142 equal in number to the teeth 87 and each having one well 143 coinciding with one side of a respective tooth. The wheel 76 is mounted upon the shaft 75 so that projection of the stop bar 135 results in its reception in one of the recesses 142. When the solenoid 141 is not energized, the spring 137 is normally free to project the stop bar through a larger portion of the rotation of the shaft 46 owing to the shape of the release cam 57 (FIGURE 6). It should be noted that operation of the wheel 76 and the stop bar 135 is so related that shaft 46 rotates cam 57 sufficiently to retract and reproject the stop bar before the wheel is rotated sufficiently to prevent engagement of the next adjacent surface 143 by the stop bar.

In other words, the wheel 76 will be locked in position when the stop bar 135 is projected by reason of the fact that the stop bar will engage one of the surfaces 143 of a recess 142. When the cam 57 is rotated to such a position that the stop bar is withdrawn, the slip clutch 72 will initiate rotation of the wheel 76. The stop bar 135 will again be projected in sufficient time to engage the wall 143 of the next adjacent recess 142 so that in each complete rotation of the wheel all of the surfaces 143 are engaged. In this manner the wheel 76 will intermittently be stepped through various positions, and intermittently advance the film through the guide 96. It should be noted that since the spacing between the teeth 87 and the surfaces 143 is equal to the length of one frame the film will be advanced exactly one frame each time the stop bar 135 is retracted. The edge on the end of the guide 96 is preferably so positioned that when the film momentarily stops the forward edge of each perforation in the film will be in alignment with the cutting edges of the members 96b and 100.

The mounting location of the wheel 76 with relation to the cutting edges and also the mounting location of the stop bar are preferably such as to result in the forward edge of each perforation being stopped precisely in alignment with the cutting edges. The fact that the surface 143 is common to a tooth and a recess is a manufacturing aid in producing a device which will properly position the film for each cut.

The device is arranged in such a manner that each time the film is so stopped, the cutting edges are brought together to cut the film. Referring to FIGURES 5 and 6, this effect is accomplished by a suitable interrelation between the hump 117 on the cam 116 and the raised portion on the cam 57. It will be noted that these raised portions face the same direction on the shaft 46. Thus, the cutter will not be operated except when the bar 135 is projected to lock wheel 76 in position.

Referring to FIGURE 9, there is illustrated fragmentarily a container or capsule 145 which is also shown in FIGURES 2 and 5. This container or capsule has an opening 146 through its top for the passage of cards (cut film) 12, a stack 147 of which is shown in FIGURE 9. The container is formed with projections 150 having inturned lips 151 which retain the stack of cards within the container. A spring 152 is received within the container and normally urges a plunger 155 against the cards so that they are held against the lips 151. The spring acts between the bottom of the plunger 155 and the bottom of the container and is received about suitable protuberances 156 on the plunger and the bottom of the container.

Referring to FIGURE 5, a mounting element 157 is mounted on the forward portion of the container and includes a horizontally extending channel 160 defined by inturned tracks 161. The container 145 is formed with indentations adapted to receive the tracks in 161 to guide the container into proper position on the film cutter. The mounting element 157 also includes a vertically reciprocal piston 162 urged upwardly by a spring 165 received about the piston and acting between the element 157 and a collar 166 on the piston. The piston reciprocates within suitable apertures 167 in the mounting element 157 and yieldably engages an indentation 170 in the bottom of the container 145 in order to retain it in position.

The blade carrier on cutting head 102 includes a portion that is positioned in substantial alignment with at least a portion of the opening 146 and to engage the cards as they are being cut. This portion of the head 102 will be effective to force each card between the lips 151 for reception in the container. A further guide 175 is fixed to the film guide 96b and functions to retain and position the container 145. The container 145 is also provided with a handle 176 for use in mounting the container in proper position and removal thereof.

When the container is removed as in FIGURE 9, a stack of cards 12 will be included in the container 145, whereby the container will act as a magazine for supplying the cards 12 for subsequent use. The cards 12 may be removed in a group by pivoting the blocking element 177 to the illustrated position. Frequently, when the atmosphere is humid, the cards will stick together making necessary the removal of the cards in a group with the blocking element 177 in the illustrated position. Normally, however, the blocking element 177 will be located in a downward position as illustrated in FIGURES 2 and 5. The thickness of the blocking member 177 is such that the upper surface 178 thereof permits the passage thereover of only one card from the stack 147, said card normally being so removed by forcing with the thumb. In other words, the upper surface 178 is parallel to but slightly below the lips 151 a sufficient distance to permit the passage of only one card at a time thereover. This feature assists the operator in rapidly removing single cards from the container for manual filing. As mentioned, however, if the cards stick together, the blocking member 177 can be pivoted to the illustrated position of FIGURE 9.

In order to control the operation of the film cutter 1, a control panel 200 may be provided on the front of the film cutter 1 so as to be readily accessible. By way of example, this panel 200 may be disposed immediately above the cutter 92. The panel 200 includes a control or selector switch 202 which is effective to turn the cutter 1 "ON" and "OFF" and to select the mode in which it will operate. In addition, a feed switch 204 and a cutter switch 206 are provided. These switches 202, 204 and 206 may be interconnected with each other, the motor 22 and solenoids 130 and 141 by means of a circuit 208 similar to that shown by the wiring diagram in FIGURE 10. More particularly, this circuit 208 includes a pair of supply lines which are adapted to be interconnected with a suitable power source such as a standard 115 volt power line.

The drive motor 22 may have one side thereof connected directly to the supply line 210. The other side of the motor 22 is connected to the other supply line 212 by one bank 214 of the mode selector switch 202. This bank 214 includes four fixed contacts 216, 217, 218 and 219 and one movable contact 220, which is effective to engage only one of the fixed contacts, 216 to 219 at a time. When the switch 202 is in the OFF position, the contact 220 will engage the contact 216 and no power will be supplied to the motor 22. However, the remaining contacts are all connected to the motor. Thus, if the switch 202 is in the ON position, the MANUAL position, or the AUTOMATIC position, the opposite side of the motor 22 will be connected to the second supply line 212. Thus, the motor 22 will be continuously energized whenever the mode switch 202 is not in the OFF position.

The solenoid 141 for controlling the stop bar 135 may have one side thereof connected directly to the supply line 210, while the opposite side is connected to the feed leader switch 204. This switch 204 is in turn interconnected with a manual contact 222 in a second bank 224 of the mode selector switch 202. Thus, in the event the mode selector switch 202 is in the manual position, closing the feed switch 204 will energize the solenoid 141 and pull the stop bar 135 into its retracted position. The bar 135 will remain in this retracted position as long as the feed switch 204 is depressed. While the stop bar 135 is retained fully retracted, the cam 57 will have no effect on the position of the bar 135. As a consequence, the wheel 76 will be free to rotate continuously and feed film through the film guide 96.

The second solenoid 130 for controlling the cutting mechanism is inter-connected with the power line 210 and the cutter switch 206 which in turn is connected with the manual contact 222 on the mode switch 202. In the event the mode switch 202 is in the MANUAL position, the solenoid 130 will normally not be energized unless the switch 206 is manually depressed. During such circumstances, the stopping element 127 will be held against the cam 60 and the stop will prevent the rotation thereof. This in turn will stop the shaft 46 rotating and prevent the wheel 76 advancing the film or the cutter cutting the film. However, when the single cut switch 206 is depressed the solenoid 130 will be energized. This will retract the stop element 127 and permit the cutter mechanism to operate.

It will thus be seen that when the mode switch 202 is in the manual position, the operator may depress the feed leader switch 204 and cause the film strip to be continuously fed through the guide 96 and past the opening 146 without being cut. After the film strip has been fed to a point where it is desired to cut a card therefrom, the single cut switch 206 may be depressed. This will cause the cutter to complete a stroke and cut a card from the film strip.

The second side of the cutter solenoid 130 may also be connected directly to the automatic contact 226 in the mode selector switch 202. If this is done, when the mode selector switch 202 is in the automatic position, the first solenoid 141 will never be energized and the running of the wheel 76 will be controlled entirely by the action of the cam 57 and the stop bar 135. At the same time he second solenoid 130 will be continuously energized so as to retain the stop element 127 in its retracted position and clear of the stop cam 60. Thus the film will be continuously fed through the cutter mechanism and chopped into cards that are simultaneously stacked in the storage capsule.

Although the foregoing mode of operation may be acceptable for many purposes, it has been found desirable to modify this mode of operation by providing additional controls over the stop solenoid 130. For example, it is desirable to stop the operation of the cutter when the container 145 contains a full stack of cards. To accomplish this a hopper-full switch 230 may be interconnected in series with the stop solenoid 130. This switch 230 is physically mounted on the front of the cutter adjacent to the container 145. An arm 232 may be provided on the switch 230 so as to project into the container 145. A complementary arm 234 may be provided on the side of the plunger 155. This arm 234 is positioned to be normally spaced from the arm 232. However, the two arms 232 and 234 are in substantial alignment with each other. Thus, as the cards are stacked in the container and the plunger 155 gradually descends the arm 234 will gradually approach the arm 232. When the container 145 is filled with a complete stack of cards the two arms 232 and 234 will engage and open the contacts in the switch 230.

When this happens the stop solenoid 130 will be disconnected from the automatic contact 226 and will, therefore, be de-energized. Upon de-energization of the solenoid 130, the stop element 127 will move outwardly and engage the stop on the cam 60. This will stop the drive shaft 46 and prevent the cutter cam 116 and wheel cam 57 rotating. Both of these cams are oriented with respect to the top so that the bar 135 will come to rest in its extended position to stop the wheel 76 and the cutter blade will be retained in its raised position.

In order to operate the present device the spool of film is mounted on the shaft 81. The film or its leader are then laid around the wheel 76 and inserted into the guide 96. The arm 91 may then be lowered to keep the film on the wheel 76. Normally the initial portion of the film will have a leader with possibly no photographic images thereon. In order to remove this leader, the mode switch 202 is placed in the manual position and the feed leader switch 204 manually depressed. This will energize the solenoid 141 simultaneously with the operation of the motor 22. This will retract the bar 135 and allow the wheel 76 to rotate. Thus a driving force will be transmitted through the shafts 24 and 30 through spur gears 65 and 66 and slip clutch 72 to the wheel 76. Since the solenoid 130 is not energized the stopping element 127 will be extended and will prevent rotation of the shaft 46. This will disable the cutter and prevent the film being cut. Because the stop bar 135 is held in retracted position by the solenoid 141, the stop bar will not engage any of the recesses 142 and the wheel 76 will rotate continuously. The leader will therefore pass through the guide and cutter without being cut and will travel as a continuous strip over the opening 146.

When it is desired to cut an individual frame from the strip, the cutter switch 206 may be closed while the mode switch 202 is in the MANUAL position. The solenoid 141 will remain de-energized and the bar 135 extended. Therefore, the wheel 76 will be locked in a fixed position and the film will not be advanced. However, the solenoid 130 will withdraw the stop member 127 and allow the cutter head 102 to be driven vertically. Thus the cutter will cut the terminal frame on the film disposed over the opening 146. Thus a single frame will be cut from the film and inserted into the container 145 if it is in position. If it is desired to cut several yards from the film strip, the film may be advanced a frame at a time by the button 204 and the cutter operated by the button switch 206.

Whenever it is desired to operate the apparatus automatically to repeatedly cut the film to form the cards 12, the mode switch 202 is placed in the AUTOMATIC position. If the container 145 is not full and the switch 230 is closed the solenoid 130 will be energized so as to retract the stop 127 and allow the shaft 46 to rotate. Since the solenoid 141 is left de-energized the cam 57 will withdraw the bar 135 permitting rotation of the wheel 76 through spur gears 65 and 66, shaft 67, slip clutch 72 and shaft 75 until the stop bar 135 engages the surface 143 of the next adjacent recess 142.

Projection of the stop bar 135 into recess 142 to a position suitable for this engagement will result from the rotation of the shaft 46 through the slip clutch 36 and the action of the spring 137. Very soon after such stopping of the wheel 76 by the stop bar 135, the cutter will be actuated by the hump 117 in the cam 116. Continued rotation of the shaft 46 will result in the raised portion of the release cam 57 again withdrawing the stop bar 135 to permit further rotation of the wheel 76, whereby the cycle will be continuously repeated.

Referring to FIGURE 7, an alternative embodiment of the cutter is illustrated. This alternative embodiment is identical to the above described embodiment with the exception that the cutter blade 100' is mounted upon the cutter carrier 102' by means of screws 101' which are received through enlarged bores 200 in the member 102'. Also, the blade 100' is yieldably urged against the guide 96a' by means of a spring 201 acting between setscrew 203 and sphere 205. It can be appreciated that the structure of FIGURE 7 maintains a relatively constant force of the cutter blade 100' against the guide 96a' and the cutter blade 96b'. This feature greatly aids in producing uniform, perfect cuts 15.

From the above description, it will be appreciated that the present invention provides an improved device for cutting perforated film in such a manner that a plurality of cards are formed each having a single indentation of the same size and shape at one end of the card. It will also be evident that the present invention provides an improved film cutter that may be operated in several different modes for cutting a single card at a time or automatically cutting a large number of cards at a high rate of speed and simultaneously stacking the cards as they are cut. In addition, the film cutter will be effective to automatically stop whenever the container is filled with a complete stack.

Although only a single embodiment of the present invention has been disclosed and described herein, it will be readily apparent to those skilled in the art that numerous changes and modifications may be made without departing from the spirit of the invention. Accordingly, the foregoing drawings and description thereof are for illustrative purposes only and do not in any way limit the invention which is defined only by the claims which follow.

What is claimed is:

1. In combination for cutting a strip of film into a plurality of film cards and for storing the cards in a stacked relationship,
   means for advancing the film strip,
   means for receiving the film cards after they are cut from the film strip, the receiving means being constructed to store a particular number of cards in stacked relationship,
   means operatively coupled to the advancing means for obtaining an interruption in the advance of the film strip after the film strip has been advanced through each successive increment,
   cutting means operatively coupled to the film strip and responsive to each interruption in the advance of the film and disposed in contiguous relationship to the receiving means for engaging and cutting the film into film cards and for simultaneously inserting the resultant cards into the receiving means during the engagement of the film by the cutting means for the purpose of performing the cutting operation, and means operatively coupled to the advancing means, the cutting means and the receiving means for disabling the advancing means and the cutting means upon the storage of the particular number of cards in the receiving means.

2. In combination for cutting a strip of film into a plurality of film cards and for storing the cards in a stacked relationship, means for advancing the film strip, receiving means having an opening disposed relative to the advancing means to receive the cards after the cutting of the film and to hold the cards in stacked relationship, means in the receiving means for exerting a force on the cards in a direction toward the opening to maintain the cards in the stacked relationship, means operatively coupled to the advancing means for obtaining an interruption in the movement of the film strip upon each advance of the film strip through a particular increment of length, cutting means disposed in contiguous relationship to the opening in the receiving means and operatively coupled to the last mentioned means for engaging the film strip in a direction toward the opening in the receiving means and for cutting the film into cards upon the engagement of the film strip and for moving the film card into the receiving means through the opening in the receiving means to obtain the stacking of the cards in the receiving means, and means operatively coupled to the last two mentioned means for disabling the last two mentioned means to obtain a continuous advance of the film, without any cutting operation on the film, during the movement of the film through a distance greater than the length of each card.

3. In combination for cutting a strip of film into a plurality of film cards and for storing the cards in a stacked relationship, receiving means having an opening at one end for providing a passage of the cards into and out of the receiving means, means disposed in the receiving means for pressing the cards within the receiving means toward the opening to maintain the cards in the receiving means in the stacked relationship, holding means, means operatively coupling the receiving means to the holding means in a removable relationship, means for obtaining an advance of the film strip past the opening in the receiving means, means in the holding means and operatively coupled to the receiving means for pressing the receiving means in a direction toward the film, means operatively coupled to the film-advancing means for obtaining an interruption in the advance of the film strip upon each advance of the film through a particular distance, means disposed in contiguous relationship to the film strip at the opening in the receiving means and operatively coupled to the film-advancing means for advancing toward the film to cut the film at a position contiguous to the opening in the receiving means to insert the resultant film card into the receiving means through the opening in the receiving means, switching means having first and second operative relationships, and means operatively coupled to the film-advancing means and to the film-cutting means and operatively coupled to the switching means for obtaining successive operations of the film-advancing means and the film-cutting means on an incremental basis in the first operative relationship of the switching means to obtain a controlled formation and stacking of a plurality of cards and for obtaining an individual operation of the film-advancing means and the film-cutting means on an individual basis in the second operative relationship of the switching means to obtain an individual formation of cards upon each operation of the switching means in the second operative relationship.

4. In combination for cutting a strip of film into a plurality of cards and for storing the cards in stacked relationship, receiving means having an opening at one end for providing a passage of the cards into and out of the receiving means, means in the receiving means for exerting a force against the cards in the receiving means in a direction toward the opening in the receiving means to maintain the cards in the stacked relationship, the receiving means having lips at the opening in the receiving means to retain the cards in the receiving means in the stacked relationship, blocking means operatively coupled to the receiving means at a position adjacent to the opening in the receiving means and movable between first and second positions and disposed relative to the lips in the receiving means in the first position to obtain an individual transfer of film cards from the receiving means through the opening in the receiving means and disposed relative to the lips in the receiving means in the second position to obtain a simultaneous removal of groups of cards from the receiving means, means for obtaining an advance of the film strip past the opening in the receiving means and means disposed relative to the film strip and the opening in the receiving means and operatively coupled to the advancing means for engaging the film strip at a position adjacent to the opening in the receiving means upon each advance of the film strip through a particular distance and for cutting the film strip and inserting the resultant film cards into the receiving means through the opening in the receiving means.

5. In combination for cutting film into a plurality of chips and for storing the chips in a stacked relationship, receiving means having an opening at one end for obtaining a transfer of chips into and out of the receiving means, means disposed in the receiving means for pressing against the chips in the receiving means to maintain the chips in the stacked relationship in the receiving means, a cutter blade, means operatively coupled to the cutter blade for biasing the cutter blade in displaced relationship to the film and the opening in the receiving means, means disposed relative to the receiving means for advancing the film past the opening in the receiving means, means operattively coupled to the film-advancing means for interrupting the advance of the film, means for obtaining an advance of the cutter blade toward the film and the opening in the receiving means to initially cut the film into chips and thereafter to insert the chips into the receiving means during the advance of the cutter blade against the action of the biasing means.

means operatively coupled to the blade-advancing means, the film-interrupting means and the film advancing means for synchronizing the advance and the cutting of the film to initially obtain an advance of the film for a particular length toward the opening in the receiving means, to subsequently obtain an interruption in such advance of the film and to obtain a cutting of the film into chips and an insertion of the chips into the receiving means during the interruption in the advance of the film, and blocking means operatively coupled to the receiving means and having first and second positions for providing for an individual removal of chips in the first position of the blocking means and for providing for a removal of groups of chips in the second position of the blocking means.

6. In combination for cutting film into a plurality of chips and for storing the chips in a stacked relationship,
   receiving means having an opening at one end for obtaining a transfer of chips into and out of the receiving means,
   means disposed in the receiving means for pressing against the chips in the receiving means to maintain the chips in the stacked relationship in the receiving means,
   a cutter blade,
   means disposed relative to the receiving means for advancing the film past the opening in the receiving means,
   means operatively coupled to the cutter blade for maintaining the cutter blade in displaced relationship to the film and the opening in the receiving means,
   means operatively coupled in the last mentioned means for obtaining an advance of the cutter blade toward the film and the opening in the receiving means to initially cut the film into chips and thereafter to insert the chips into the receiving means during the advance of the cutter blade and for thereafter obtaining a movement of the cutter blade in a direction away from the film and the opening in the receiving means,
   means operatively coupled to the blade-advancing means and the film-advancing means for snchronizing the advance of the film and the cutting of the film into chips to produce successive chips of a particular length,
   switching means having first and second operative relationships, and
   means operatively coupled to the blade-advancing means and the film-advancing means and the switching means for obtaining a continuous operation of the blade-advancing means and the film-advancing means on a synchronized basis in the first operative relationship of the switching means to obtain an automatic production and stacking of a plurality of chips and for obtaining a single operation of the blade-advancing means and the film-advancing means in the second operative relationship of the switching means to obtain the production and stacking of only a single chip.

7. In combination for cutting film into a plurality of chips and for storing the chips in a stacked relationship,
   means for advancing the film,
   receiving means having an opening at one end for providing a passage of the chips into and out of the receiving means,
   holding means operatively coupled to the receiving means for retaining the receiving means in a removable relationship and for retaining the receiving means with the opening adjacent to the film on one side of the film,
   means operatively coupled to the receiving means and to the holding means for pressing the receiving means toward the film,
   a cutter disposed in adjacent relationship to the opening in the receiving means on the opposite side of the film from the opening in the receiving means,
   means operatively coupled to the cutter for biasing the cutter in a direction away from the film,
   means synchronized with the advance of the film through each increment of a particular length and operatively coupled to the cutter for moving the cutter toward the film against the bias on the cutter to initially cut the film into chips and to insert the chips into the receiving means through the opening in the receiving means and for providing a release of the cutter upon the insertion of the chips into the receiving means to bias the cutter away from the film,
   switching means having first and second operative relationships, and
   means operatively coupled to the switching means and to the film-advancing means and to the cutter for disabling the cutter and obtaining a continuous operation of the film-advancing means in the first operative relationship of the switching means during a movement of the film through a distance greater than the length of each chip and for obtaining an intermittent operation of the film-advancing means and the cutter on an intermittent and synchronized basis in the second operative relationship of the switching means to obtain the production of a plurality of chips and the stacking of the chips in the receiving means.

8. In combination for cutting film into a plurality of chips and for storing the chips in a stacked relationship,
   receiving means having an opening at one end for providing a passage of chips into and out of the receiving means through the opening in the receiving means,
   means for providing an advance of the film past the opening in the receiving means,
   stop means disposed in a first position out of operatively coupled relationship to the film-advancing means to provide for an advance of the film and movable to a second position in operatively coupled relationship to the film-advancing means to obtain an interruption in the advance of the film,
   first means operatively coupled to the stop means to limit the advance of the film to a particular length upon the energizing of the first means,
   second means operatively coupled to the stop means and operative when energized to obtain successive incremental advances of the film where each advance corresponds to the particular length,
   a cutter blade,
   means operatively coupled to the cutter blade to bias the blade in displaced relationship to the film on the opposite side of the film from the opening in the receiving means, and
   means operatively coupled to the cutter blade and to the first means and to the second means and responsive to each incremental advance of the film for the particular length to move the cutter blade against the film for a cutting of the film by the blade and for the insertion of the resultant chip into the receiving means through the opening in the receiving means.

9. The combination set forth in claim 8 wherein
   means are operatively coupled to the film-advancing means and to the first means and to the second means for obtaining a continuous advance of the film for distances greater than the distances of incremental length, and
   wherein means are operatively coupled to the film-advancing means to prevent the cutter from engaging the film during the advance of the film.

10. In combination for cutting film into a plurality of chips and for storing the chips in a stacked relationship,
    receiving means having an opening at one end for providing a passage of chips into and out of the receiving means through the opening in the receiving means,
    means for providing an advance of the film past the opening in the receiving means,
    stop means disposed in a first position out of operatively coupled relationship to the film-advancing means to provide for an advance of the film and movable to a second position in operatively coupled relationship to the film-advancing means to obtain an interruption in the advance of the film, first means operatively coupled to the stop means to limit the advance of the film to a particular length upon the energizing of the first means, second means operatively coupled to the stop means and operative when energized to obtain successive incremental advances of the film where each advance corresponds to the particular length, cutter means operatively coupled to the first means and the second means for cutting the film upon each incremental advance of the film for the particular length, means operatively coupled to the film-advancing means and to the first means and to the second means for obtaining a continuous advance of the film for distances greater than the distances of incremental length, and means operatively coupled to the cutter means for preventing any cutting of the film by the cutter means during the advance of the film.

11. In combination for cutting film into a plurality of chips and for storing the chips in a stacked relationship, receiving means having an opening at one end for providing a passage of chips into and out of the receiving means, the receiving means being constructed to store a particular number of chips in stacked relationship, means for providing an advance of the film past the opening in the receiving means, first means operatively coupled to the advancing means to limit the advance of the film to a particular length upon the energizing of the first means, second means operatively coupled to the advancing means and to the first means and operative when energized to obtain successive incremental advances of the film where each advance corresponds to the particular length, a cutter disposed in contiguous relationship to the film and to the opening on the opposite side of the film from the opening and movable into engagement with the film upon each advance of the film for the particular length for cutting the film and inserting the film into the receiving means through the opening in the receiving means, means operatively coupled to the first means and the second means and the cutter and responsive to each incremental advance of the film for the particular length by the first and second means for obtaining an advance of the cutter against the film to obtain a cutting of the film and an insertion of the resultant chip into the receiving means through the opening in the receiving means, means operatively coupled to the receiving means for providing a particular indication when the particular number of cards becomes stored in the receiving means, and means operatively coupled to the last mentioned means and to the film-advancing means and the cutter for disabling the film-advancing means and the cutter when the last mentioned means provides the particular indication.

12. In combination for cutting film into a plurality of chips and for storing the chips in a stacked relationship, receiving means having an opening at one end for providing a passage of the chips into and out of the receiving means, means in the receiving means for exerting a force against the chips in the receiving means in a direction toward the opening in the receiving means to maintain the chips in the stacked relationship, the receiving means having lips in the receiving means at positions adjacent to the opening in the receiving means at one end of the receiving means to limit the dimensions of the opening at that end and to retain the chips within the receiving means, means for intermittently advancing the film toward the opening in the receiving means, means operatively coupled to the film-advancing means for cutting the film into chips upon each advance of the film and for inserting the chips into the receiving means through the opening in the receiving means, and blocking means operatively coupled to the receiving means at a position adjacent to the opening in the receiving means and displaced from the opening in the direction of movement of the film and provided with a surface displaced into the opening relative to the lips by a distance corresponding substantially to the thickness of the film to provide for an individual removal of chips from the receiving means by sliding the chips from the opening along the surface of the blocking means, the blocking means being pivotable to a position away from the opening in the receiving means to provide for a simultaneous removal of groups of chips from the receiving means through the opening in the receiving means.

13. The combination set forth in claim 12 wherein the film-cutting means includes a cutter disposed in contiguous relationship to the film and to the opening in the receiving means and further includes means operatively coupled to the cutter for biasing the cutter blade in displaced relationship to the film on the opposite side of the film from the opening in the film and further includes means operatively coupled to the cutter for moving the cutter into engagement with the film upon each advancement of the film to cut the film and insert the film into the receiving means through the opening in the receiving means.

14. In combination for forming a plurality of cards from a continuous film and for storing the cards in a stacked relationship, receiving means having an opening at one end for providing a passage of the cards into and out of the receiving means, means in the receiving means for exerting a force against the cards in the receiving means in a direction toward the opening in the receiving means to maintain the cards in the stacked relationship, the receiving means having lips at the opening in the receiving means to retain the cards in the receiving means in the stacked relationship, blocking means operatively coupled to the receiving means at a position adjacent to the opening in the receiving means and movable between first and second positions and disposed relative to the lips in the receiving means in the first position to obtain an individual transfer of cards from the receiving means through the opening in the receiving means and disposed relative to the lips in the receiving means in the second position to obtain a simultaneous removal of groups of cards from the receiving means, means disposed relative to the receiving means for obtaining an advance of the film past the receiving means, and means responsive to each advance of the film through a particular distance relative to the receiving means for cutting the film to form another one of the cards in the plurality and for inserting the card into the receiving means.

15. In combination for forming a plurality of cards from a continuous film and for storing the cards in a stacked relationship, receiving means having an opening at one end for providing a passage of the cards into and out of the receiving means, means in the receiving means for exerting a force against the cards in the receiving means in a direction toward the opening in the receiving means to maintain the cards in the stacked relationship, the receiving means having lips at the opening in the receiving means to retain the cards in the receiving means in the stacked relationship, blocking means operatively coupled to the receiving means at a position adjacent to the opening in the receiving means and movable between first and second positions and disposed relative to the lips in the receiving means in the first position to obtain an individual transfer of cards from the receiving means through the opening in the receiving means and disposed relative to the lips in the receiving means in the second position to obtain a simultaneous removal of groups of cards from the receiving means, said blocking means have a surface disposed within the opening in the receiving means at a position displaced from the lips by a distance corresponding substantially to the thickness of the film and wherein the blocking means are displaced from the opening in the receiving means to obtain an individual sliding of cards along the surface of the blocking means for a transfer of cards from the receiving means and wherein the blocking means are pivotable between the first and second positions, means disposed relative to the receiving means for obtaining an advance of the film past the receiving means, means responsive to each advance of the film through a particular increment of distance relative to the receiving means for cutting the film to form another one of the cards in the plurality and for obtaining a storage of the card in the stacked relationship in the receiving means, means operatively coupled to the receiving means for providing a particular indication when a particular number of cards is stored in the receiving means, and means operatively coupled to the last mentioned means and to the film-advancing means and to the cutting means for disabling the film-advancing means and the cutting means when the last mentioned means provides the particular indication.

16. Apparatus for cutting a strip of film having a series of frames into a plurality of film cards with each card containing a frame, said apparatus including:

a film guide for receiving said strip of film and allowing said film strip to travel therethrough, feed means for advancing said film strip through said guide and momentarily stopping the advance of the film strip through said guide each time the film strip advances the length of one frame, a cutting head disposed adjacent said film guide and including a cutting blade positioned to engage and cut said film into film cards, means operatively coupled to said feed means for actuating said cutting head and cutting said film strip in the space between a pair of adjacent frames each time said film strip stops, means for disabling said last means to permit said feed means to drive said film strip through said film guide without cutting said film into cards.

17. Apparatus for cutting a strip of film having a series of frames into a plurality of film cards with each card containing a frame, said apparatus including:

a film guide for receiving said strip of film and allowing said film strip to travel therethrough.

feed means for advancing said film strip through said guide and momentarily stopping the advance of the film strip through said guide each time the film strip advances the length of one frame, a cutting head disposed adjacent said film guide, drive means operatively coupled to said feed means for actuating said cutting head through a complete stroke towards and away from said film strip each time said film strip stops advancing, a cutting blade mounted on said head and positioned to register with the space between a pair of adjacent frames whenever said film strip stops and to cut a film card from said film strip each time said cutting head completes a stroke, means operatively interconnected with said cutting head to simultaneously disable said feed means and said drive means when said cutting head completes a stroke, means for storing the cards formed by the cutting blade, means operatively interconnected with the cutting head and with the feed means for reinstituting an operation of the cutting blade and the feed means each time that the cutting head completes a stroke, and means operatively interconnected with the storing means and with the cutting head and with the feed means for preventing the feed means and the drive means from reinstituting operations when a particular number of cards have been stored in the storing means.

18. Apparatus for cutting a continuous strip of film having a series of frames into a plurality of film cards with each card containing a frame and for stacking said cards, said apparatus including:

a film guide for receiving said strip of film and allowing said strip to travel therethrough and emerge from one end of said guide, feed means for advancing the strip of film through said film guide and beyond said end, stop means operatively coupled to the feed means and effective to normally stop the advance of the film strip each time said film strip moves a distance equal to the length of a frame to thereby position the terminal frame on said strip adjacent said end of said guide, receiving means disposed adjacent the end of said film guide and having an opening adjacent the end of said guide when said film strip is momentarily stopped, a cutting head disposed adjacent the end of said guide and in substantial alignment with said opening for moving toward and away from said opening, a cutting edge on said head for engaging said film along the edge of the terminal frame for cutting a film card from said strip containing said frame, means operatively coupled to said cutting head and to said stop means and effective whenever the film strip stops to actuate said cutting head for cutting said card from the film strip, means on said head for engaging said card as it is cut from said strip to simultaneously force said card through said opening and into said receiving means, blocking means on the receiving means and movable between first and second positions and disposed relative to the opening in the receiving means to provide for a removal of individual cards from the receiving means in the first position of the blocking means and to provide for a removal of groups of cards from the receiving means in the second position of the blocking means, and means operatively coupled to the feed means and the cutting head for preventing any further operation of the feed means and the cutting head when a particular number of cards has been stored in the receiving means.

19. Apparatus for cutting a strip of film having a series of frames into a plurality of film cards with each card containing a frame and for stacking said cards, said apparatus including:

a film guide for receiving said strip of film and allowing said strip to travel therethrough and emerge from one end of said guide, feed means for advancing the strip of film through said film guide and beyond said end, stop means operatively coupled to the feed means and effective to normally stop the advance of the film strip each time said film strip moves a distance equal to the length of a frame to thereby position said film strip adjacent said end of said guide in a position for forming a frame, receiving means disposed adjacent the end of said film guide and having an opening therein adjacent the end of said guide when said film strip is momentarily stopped, a cutting head disposed adjacent the end of said guide and in substantial alignment with said opening for cutting said film along the edge of said terminal frame for cutting a film card from said strip and simultaneously forcing said card into said receiving means, means operatively coupled to said cutting head and to said stop means and effective whenever the film strip stops to actuate said cutting head for cutting said card from the film strip, means operatively coupled to said last means to disable said cutting head while said feed means advances said film strip through said guide to thereby prevent the cutting of said film strip and allow the uncut film strip to be advanced past said opening, blocking means having first and second positions and disposed on said receiving means relative to the opening in the receiving means to provide for a removal of individual cards from the receiving means in the first position of the blocking means and to provide for a removal of groups of cards from the receiving means in the second position of the blocking means, and means operatively coupled to the feed means and to the cutting head for obtaining an advance of the film past the cutting head for distances greater than the length of each frame without obtaining an operation of the cutting head.

20. Apparatus for cutting a continuous strip of film having a series of frames into a plurality of film cards with each card containing a frame and for stacking said cards, said apparatus including:

a film guide for receiving said strip of film and allowing said strip to travel therethrough and emerge from one end of said guide, feed means for intermittently advancing the strip of film through said film guide distances equal to the length of a frame to thereby momentarily position said strip adjacent said end of said guide in a position for forming a frame, receiving means disposed adjacent the end of said film guide and having an opening adjacent the end of said guide when said film strip is momentarily stopped, a cutting head disposed adjacent the end of said guide and in substantial alignment with said opening for moving toward and away from said opening, a cutting edge on said head for engaging said film along the edge of the terminal frame for cutting a film card from said strip containing said frame, a cutting head drive operatively coupled to said cutting head and to said stop means and effective when the film strip stops to actuate said cutting head for cutting said card from the film strip, means on said head for engaging said card as it is cut from said strip to simultaneously force said card through said opening and into said receiving means, and manually operable means operatively coupled to the cutting head drive to disable said drive while said feed means advances the continuous film strip through said guide to thereby prevent the cutting of said film strip and allow the uncut continuous film strip to pass over said opening through distances greater than the length of each frame.

21. Apparatus for cutting a strip of film having a series of frames into a plurality of film cards with each card containing a frame and for stacking said cards, said apparatus including:

a film guide for receiving said strip of film and allowing said strip to travel therethrough and emerge from one end of said guide, feed means for advancing the strip of film through said film guide and beyond said end, stop means operatively coupled to the feed means and effective to intermittently stop the advance of the film strip each time said film strip moves a distance equal to the length of a frame to thereby momentarily position said strip adjacent said end of said guide in a position to define a frame, receiving means disposed adjacent the end of said film guide and having an opening adjacent the end of said guide when said film strip is momentarily stopped, a cutting head disposed adjacent the end of said guide and in substantial alignment with said opening for moving between a retracted position and an extended position adjacent said opening, a cutting edge on said cutting head for engaging said film when said cutting head moves into the extended position, said edge being positioned to cut said film strip to form a card, a cutting head drive operatively coupled to said cutting head and to said stop means and effective when the film strip stops to move said cutting head from said retracted position to said extended position for cutting said card from the film strip, means on said head for engaging said card as the cutting head moves into the extended position to said card through said opening and into said receiving means, manually actuatable means operatively coupled to the cutting head drive to disable said cutting head while said feed means advances the continuous film strip through said guide to thereby prevent the cutting of said film strip and allow the uncut continuous film strip to pass below said last means and over said opening through distances greater than the length of each frame, and means operatively coupled to the cutting head drive and to the feed means for disabling the cutting head drive and the feed means when a particular number of cards has been stored in the receiving means.

22. Apparatus for cutting a strip of film having a series of frames into a plurality of film cards with each card containing a frame and for stacking said cards, said apparatus including:

a film guide having a passage for receiving said strip of film and allowing said strip to travel therethrough and emerge from one end of said guide, feed means for intermittently advancing the strip of film through said film guide and beyond said end in increments substantially equal to the length of a frame to thereby momentarily position said film strip adjacent said end of said guide in a position to define a frame.

receiving means disposed adjacent the end of said film guide and having an opening, a cutting head disposed adjacent said end of said guide and in substantial alignment with said opening for moving between an extended position adjacent said opening and a retracted position away from said opening, a cutting edge on said head positioned to engage said film strip along the edge of said terminal frame for cutting a film card from said strip when said cutting head moves into said extended position, means operatively coupled to said cutting head and to said stop means and effective when the film strip stops to actuate said cutting head for cutting a film card from the film strip, switching means having first and second operative relationships, means operatively coupled to the feed means and to the cutting head and responsive to the operation of the switching means in the first relationship to disable said feed means and said cutting head after said cutting head has completed a cutting stroke and cut a single terminal frame from said film strip, and means operatively coupled to the feed means and to the cutting head and responsive to the operation of the switching means in the second relationship for obtaining an operation of the feed means and the cutting head on a synchronized basis through a plurality of intermittent operations to obtain the formation of a plurality of cards.

23. Apparatus for cutting a strip of film having a series of frames into a plurality of film cards with each card containing a frame and for stacking said cards, said apparatus including:

a film guide having a passage for receiving said strip of film and allowing said strip to travel therethrough and emerge from one end of said guide, feed means for advancing the strip of film through said film guide and beyond said end, stop means operatively coupled to the feed means and effective to momentarily stop the advance of the film strip each time said film strip moves a distance equal to the length of a frame to momentarily position the terminal frame on said film strip adjacent said end of said guide, receiving means disposed adjacent the end of said film guide and having an opening, a cutting head disposed adjacent said end of said guide and in substantial alignment with said opening for moving between an extended position adjacent said opening and a retracted position away from said opening, a cutting edge on said head positioned to engage said film strip along the edge of said terminal frame for cutting a film card from said strip when said cutting head moves into said extended position, means on said cutting head disposed in substantial alignment with said opening for engaging said card as the cutting head moves into the extended position and is cut by said edge, said means being effective to force said card through said opening and into said receiving means, drive means operatively coupled to said cutting head and to said stop means and effective whenever the film strip stops to actuate said cutting head for cutting a card from the film strip, switching means having first, second and third operative relationships, means operatively coupled to the stop means and to the drive means and responsive to the operation of the switching means in the first relationship to disable both said cutting head and said feed means after said cutting head has completed one stroke and has cut a single frame from said film strip, means operatively coupled to the stop means and to the drive means and responsive to the operation of the switching means in the second relationship to obtain intermittent operations of the stop means and the drive means for the formation of a plurality of cards, and means operatively coupled to the stop means and to the drive means and responsive to the operation of the switching means in the third relationship to disable the stop means and the switching means for the movement of the film past the opening in the receiving means through distances greater than the length of each card.

24. Means for cutting a strip of film into a plurality of film cards and for storing the cards in a stacked relationship, receiving means having an opening at one end providing a passage of cards into and out of the receiving means, means disposed in the receiving means for maintaining the cards in the receiving means in a stacked relationship, means for obtaining an advance of the film past the opening in the receiving means, means operatively coupled to the film-advancing means for obtaining an interruption in the advance of the film strip upon each advance of the film strip through a particular distance, means disposed adjacent said receiving means for advancing toward the film to cut the film and insert the resultant card into the receiving means through the opening in the receiving means, and means responsive to the height of the stack in said receiving means and effective to stop said advancing means to prevent further movement of said film strip when the height of said stack excedes a predetermined amount.

25. Means for cutting a strip of film having a series of frames into a plurality of film cards with each card containing a frame and for stacking said cards, said means including, a film guide having a passage for receiving said film and allowing said film to slide therethrough and emerge from one end, feed means for intermittently advancing said film through said guide increment equal to the length of a frame so that the frames on said film will successively be momentarily disposed adjacent the one end of said guide, receiving means having an opening disposed adjacent said end of said guide so that the film emerging from said end will pass over said opening, said receiving means being constructed to retain a stack of said cards therein, cutting means disposed adjacent said end of said guide for cutting said film strip in the space between the adjacent frames when each time said film is momentarily stopped and forcing the resultant film card through said opening and onto said stack, and means responsive to the height of said stack for disabling said feed means to prevent said film strip traveling through said guide whenever said stack reaches a predetermined height.

26. Means for cutting a strip of film having a series of frames into a plurality of film cards with each card containing a frame and for stacking said cards, said means including:

a film guide having a passage for receiving said film and allowing said film to slide therethrough and emerge from one end, a feed means for intermittently advancing said film through said guide in increments equal to the length of said frame so that the terminal frame on said film strip may be disposed adjacent the end of said film guide, receiving means including a container for holding a stack of film cards, said container having an opening on one end disposed adjacent the end of said guide so that the terminal frame on said film strip may be disposed adjacent said opening, a cutting head disposed adjacent said end of said guide and including a cutting edge for cutting said film strip along one edge of said terminal frame when said film is momentarily stopped to cut a film card therefrom, means for engaging the film as said card is cut therefrom and forcing the card through said opening and into the container and onto said stack of cards, means operatively interconnected with said receiving means and responsive to the height of the stack in said container, said means being operatively interconnected with said feed means and effective to disable to the feed means whenever said stack reaches a predetermined height, blocking means movable between first and second positions and disposed relative to the opening in the container to provide for a removal of individual cards from the container in the first position of the blocking means and to provide for a removal of groups of cards from the container in the second position of the blocking means.

27. Means for cutting a strip of film having a series of frames into a plurality of film cards with each card containing a frame and for stacking said cards, said means including:

a film guide for receiving said strip of film and allowing said strip to travel therethrough and emerge from one end of said guide, feed means for advancing the strip of film through said film guide and beyond said end, stop means operatively coupled to the feed means and effective to normally stop the advance of the film strip each time said film strip moves a distance equal to the length of a frame to thereby position said film strip adjacent said end of said guide in a position to define a frame, receiving means disposed adjacent said end of said film guide, said receiving means including a container having an opening in one end, reciprocating means disposed in said container for biasing said stack toward said opening, a cutting head disposed adjacent said end of said guide and in substantial alignment with said opening for moving toward and away from said opening, a cutting edge on said head for engaging said film along the edge of said terminal frame for cutting a film card from said strip, means on said cutting head for engaging said card as it is cut by said edge and forcing said card through said opening and onto said stack, means operatively coupled to said receiving means and responsive to the position of said reciprocating means, said means being operatively interconnected with said feed means and effective to disable said feed means when said stack is sufficiently long to force said reciprocating means beyond a predetermined position.

28. Means for cutting a continuous strip of film having a series of frames into a plurality of film cards with each card containing a frame and for stacking said cards, and means including:

a film guide for receiving said strip of film and allowing said strip to travel therethrough and emerge from one end of said guide, feed means operatively connected with said film for advancing the strip of film through said film guide and past said end, cutting means disposed adjacent said end of said guide and including a cutting edge for cutting cards from said film strip, a drive operatively interconnected with said feed means and said cutting means for driving both means so as to advance said film strip and cut it into film cards, means operatively interconnected with said drive to prevent the operation of said cutting means while said feed means continues to operate.

29. Means for cutting a continuous strip of film having a series of frames into a plurality of film cards with each card cutting a frame and for stacking said cards, said means including:

a film guide for receiving said strip of film and allowing said strip to travel therethrough and emerge from one end of said guide, feed means operatively connected with said film for advancing the strip of film through said film guide and past said end, cutting means disposed adjacent said end of said guide and including a cutting edge for cutting cards from said film strip, a drive means having a first branch operatively interconnected with said feed means and a second branch operatively interconnected with said cutting means for driving said feed means to intermittently advance said film strip through said film guide and for driving said cutting means to cut a film card from said film strip each time said film strip stops, first stop means in said first branch effective to disable that branch and prevent the operation of the feed means, a first manually operable switch interconnected with said first stop means for controlling the operation thereof, second stop means in said second branch effective to disable that branch and prevent the operation of the cutting means, a second manually operable switch interconnected with said second stop means for controlling the operation thereof, and a mode selector switch moveable between a first position that enables both of said manually operable switches and a second position that disables both of said stop means.

References Cited by the Examiner
UNITED STATES PATENTS

| | | | |
|---|---|---|---|
| 798,261 | 8/1905 | Brown | 312—61 |
| 953,953 | 4/1910 | Inglee | 312—61 X |
| 1,269,368 | 6/1918 | Beardsley | 83—96 |
| 2,000,159 | 5/1935 | Bolognino | 83—367 |
| 2,656,233 | 10/1953 | Bollmann | 312—61 |
| 2,697,488 | 12/1954 | Stempel | 83—96 |
| 2,797,753 | 7/1957 | Bornemann | 83—211 X |
| 2,922,171 | 1/1960 | Kleineberg et al. | 83—63 X |
| 3,082,654 | 3/1963 | Dobkin | 83—372 |
| 3,143,908 | 8/1964 | Schildt et al. | 83—96 |
| 3,174,371 | 3/1965 | Maconber | 83—86 |

ANDREW R. JUHASZ, *Primary Examiner.*

WILLIAM W. DYER, Jr., *Examiner.*

F. T. YOST, L. B. TAYLOR, *Assistant Examiners.*